United States Patent
Lin et al.

(10) Patent No.: US 12,089,207 B2
(45) Date of Patent: Sep. 10, 2024

(54) METHOD FOR SCHEDULING REQUEST TRANSMISSION AND TERMINAL DEVICE

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 321 days.

(21) Appl. No.: 17/539,085

(22) Filed: Nov. 30, 2021

(65) Prior Publication Data

US 2022/0086880 A1 Mar. 17, 2022

Related U.S. Application Data

(63) Continuation of application No. PCT/CN2019/096870, filed on Jul. 19, 2019.

(51) Int. Cl.
*H04W 4/00* (2018.01)
*H04W 72/0446* (2023.01)
*H04W 72/1268* (2023.01)
*H04W 72/542* (2023.01)
*H04W 72/566* (2023.01)

(52) U.S. Cl.
CPC ... *H04W 72/1268* (2013.01); *H04W 72/0446* (2013.01); *H04W 72/542* (2023.01); *H04W 72/566* (2023.01)

(58) Field of Classification Search
CPC . H04W 72/1268; H04W 72/04; H04W 72/12; H04W 72/50
See application file for complete search history.

(56) References Cited

U.S. PATENT DOCUMENTS

| | | | |
|---|---|---|---|
| 2017/0311317 A1* | 10/2017 | Dinan | H04W 72/52 |
| 2018/0160423 A1* | 6/2018 | Yan | H04L 5/0057 |
| 2018/0352568 A1 | 12/2018 | Kim et al. | |

FOREIGN PATENT DOCUMENTS

| | | |
|---|---|---|
| CN | 109156028 A | 1/2019 |
| CN | 109474955 A | 3/2019 |
| CN | 109995484 A | 7/2019 |
| EP | 3471489 A1 | 4/2019 |
| JP | 2019054380 A | 4/2019 |

(Continued)

OTHER PUBLICATIONS

EPO, Office Action for EP Application No. 19938507.1, Mar. 14, 2023.

(Continued)

*Primary Examiner* — Shantell L Heiber
(74) *Attorney, Agent, or Firm* — Hodgson Russ LLP

(57) ABSTRACT

Methods for scheduling request (SR) transmission and a terminal device are provided. The method includes the following. When K SR configurations include a first SR configuration that satisfies a first preset condition, transmit first SR information corresponding to the first SR configuration through a first uplink channel, where K physical uplink control channels (PUCCHs) overlap with the first uplink channel, the K PUCCHs are configured to carry SR information corresponding to the K SR configurations, and K is a positive integer.

12 Claims, 5 Drawing Sheets

(56) References Cited

FOREIGN PATENT DOCUMENTS

WO 2010002642 A1 1/2010
WO 2019137503 7/2019

OTHER PUBLICATIONS

JPO, Office Action for JP Application No. 2021-577522, Apr. 26, 2023.
EPO, Communication for EP Application No. 19938507.1, Jul. 26, 2023.
VIVO, "Discussion on short PUCCH for URLLC," 3GPP TSG RAN WG1 Meeting #93, R1-1806061, May 2018.
CNIPA, First Office Action for CN Application No. 202110775847.7, Nov. 14, 2022.
3GPP TSG RAN WG1 #97 Reno, USA, R1-1907754, OPPO, Summary on UCI enhancements for URLLC, May 13-17, 2019, 19 pages.
3GPP TSG RAN WG1 Meeting #93 Busan, Korea, R1-1806180, Panasonic, Discussion on PUCCH overlap issues, May 21-25, 2018, 4 pages.
3GPP TSG RAN WG1 #96 Athens, Greece, R1-1902422 OPPO, Discussions on intra-UE multiplexing scenarios, Feb. 25-Mar. 1, 2019, 6 pages.
International Search Report with English Translation for PCT Application PCT/CN2019/096870 mailed Apr. 17, 2020. (11 pages).
CATT, "UL Control Enhancements for URRLC", 3GPP TSG RAN WG1 Meeting #97, May 13, 2019, R1-1906328, USA.
ZTE et al., "Remaining Issues on Short PUCCH", 3GPP TSG RAN WG1 Meeting #92b, Apr. 16, 2018, R1-1803794, China.
Qualcomm Incorporated, "UCI Enhancements for eURLLC", 3GPP TSG RAN WG1 #97, May 13, 2019, R1-1907282, USA.
EPO, Extended European Search Report for EP 19938507.1, May 4, 2022.
IP India, Examination Report for IN 202127060789, May 6, 2022.
ZTE, "Issues related to Long PUCCH," 3GPP TSG RAN WG1 Meeting #93, R1-1806138, May 2018.
JPO, Office Action for JP Application No. 2021-577522, Oct. 31, 2023.

* cited by examiner

METHOD FOR SCHEDULING REQUEST TRANSMISSION AND TERMINAL DEVICE

CROSS-REFERENCE TO RELATED APPLICATION(S)

This application is a continuation of International Application No. PCT/CN2019/096870, filed on Jul. 19, 2019, the entire disclosure of which is hereby incorporated by reference.

TECHNICAL FIELD

This disclosure relates to the technical field of communication technology, and in particular to a method for scheduling request (SR) transmission and a terminal device.

BACKGROUND

A 5th generation mobile network (or 5th generation wireless system, 5G) new radio (NR) communication standard supports various services including enhanced mobile broadband (eMBB) services, ultra-reliable low latency communications (URLLC) services, and so on. The eMBB service has features of a large amount of data, a high transmission rate, and a low sensitivity for latency, and a relatively long time-domain scheduling unit is usually used to transmit the eMBB service. As for the URLLC service, a data package is generated suddenly and randomly, and the URLLC service has a high requirement for latency.

A terminal device transmits an SR to a base station to request the base station to allocate an uplink channel resource for transmitting new data. A physical uplink control channel (PUCCH) resource for transmitting an SR is semi-statically configured by the base station via high-layer signaling, where the PUCCH resource is periodic. As for the URLLC service, in order to satisfy the requirement for latency, it is reasonable to use a short-period PUCCH resource to transmit a corresponding SR. Since the eMBB service is insensitive to latency, in order to improve system efficiency, it is reasonable to use a long-period PUCCH resource to transmit a corresponding SR.

SUMMARY

In implementations of the disclosure, a method for scheduling request (SR) transmission and a terminal device are provided.

According to a first aspect, a method for SR transmission is provided in the implementations of the disclosure. The method is applied to a terminal device and includes the following. On condition that K SR configurations include a first SR configuration that satisfies a first preset condition, transmit first SR information corresponding to the first SR configuration through a first uplink channel, where K physical uplink control channels (PUCCHs) overlap with the first uplink channel, the K PUCCHs are configured to carry SR information corresponding to the K SR configurations, and K is a positive integer.

According to a second aspect, a method for SR transmission is provided in the implementations of the disclosure. The method is applied to a network device and includes the following. Receive first SR information corresponding to a first SR configuration through a first uplink channel, where the first SR configuration is an SR configuration satisfying a first preset condition in K SR configurations, and where K PUCCHs overlap with the first uplink channel, the K PUCCHs are configured to carry SR information corresponding to the K SR configurations, and K is a positive integer.

According to a third aspect, a terminal device is provided in the implementations of the disclosure. The terminal device includes a transceiver, a processor, and a memory storing a computer program which, when executed by the processor, causes the transceiver to transmit, on condition that K SR configurations include a first SR configuration that satisfies a first preset condition, first SR information corresponding to the first SR configuration through a first uplink channel, where K PUCCHs overlap with the first uplink channel, the K PUCCHs are configured to carry SR information corresponding to the K SR configurations, and K is a positive integer.

BRIEF DESCRIPTION OF DRAWINGS

The following will give a brief introduction to accompanying drawings used for describing implementations or the related art.

DETAILED DESCRIPTION

The following will describe technical solutions of implementations of the disclosure with reference to accompanying drawings.

In order to simultaneously satisfy various service characteristics, a release 15 (Rel-15) of a new radio (NR) standard supports configuration of multiple scheduling request (SR) configurations for a user equipment (UE). Different SR configurations correspond to different physical transmission resources (including a period and a physical uplink control channel (PUCCH) resource). Each SR configuration has a corresponding identity (ID), i.e., schedulingRequestID, and a corresponding resource ID, i.e., schedulingRequestResourceId.

A logical channel (the logical channel can be used to distinguish service types, for example, a logical channel corresponding to an enhanced mobile broadband (eMBB) service is different from that corresponding to an ultra-reliable low latency communication (URLLC) service) may correspond to one SR configuration at most, but one SR configuration may correspond to multiple logical channels. When in a logical channel there may be new data to be transmitted, a terminal device can transmit a positive SR by using a PUCCH resource to which an SR configuration corresponding to the logical channel belongs. Correspondingly, when a base station receives a positive SR on a PUCCH resource, it can be determined that there is new data to be transmitted in a logical channel corresponding to an SR configuration to which the PUCCH resource belongs. The base station can perform a reasonable physical channel scheduling according to service characteristics of the logical channel.

Figure 1A:
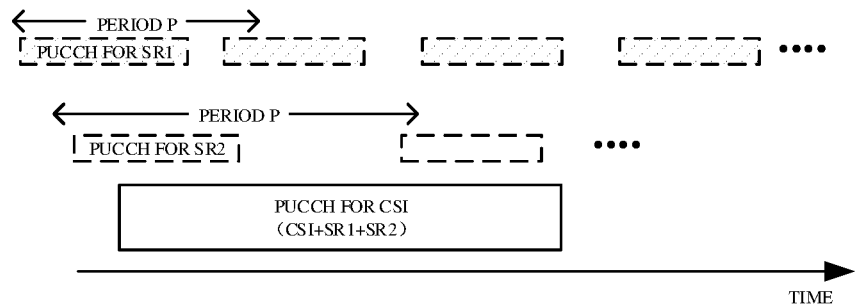
FIG. 1A is a schematic diagram illustrating transmission of a scheduling request (SR) configuration and a first uplink channel according to implementations of the disclosure.

In the Rel-15, when a PUCCH for transmitting acknowledgement/negative acknowledgement (ACK/NACK) or channel state information (CSI) overlap with K PUCCHs for transmitting SRs (the K PUCCHs respectively correspond to K SR configurations) on a time domain, a terminal device may multiplex $\lceil \log_2(L+1) \rceil$-bit information and one of the ACK/NACK or the CSI for transmission. As illustrated in FIG. 1A (PUCCH for X represents a PUCCH for transmitting X, and X may be SR1, SR2, or CSI), the PUCCH for transmitting the CSI overlaps with two PUCCHs for transmitting SRs on the time domain, and the terminal device may multiplex the $\lceil \log_2(L+1) \rceil$-bit information (where K=2) and the CSI for transmission. When a value of each bit in the $\lceil \log_2(L+1) \rceil$-bit information is 0, it indicates that all the K SR configurations are negative SRs; otherwise, it indicates that an SR configuration is a positive SR, where a value of schedulingRequestResourceId of the SR configuration is a value of the $\lceil \log_2(L+1) \rceil$-bit information.

As described above, the method for SR multiplexing transmission may not be well adapted to a latency requirement of a URLLC service, and has two problems as follows.

Figure 1B:
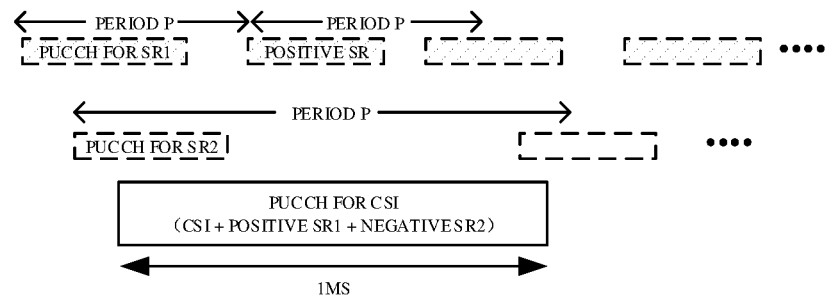
FIG. 1B is a schematic diagram illustrating transmission of an SR configuration and a first uplink channel according to other implementations of the disclosure.

1. After multiplexing transmission of SR information and other information, the SR information can be obtained after all multiplexing information is successfully demodulated, resulting in great increase in transmission latency of a URLLC service. For example, for a URLLC service with a transmission-latency requirement of 1 millisecond (ms) (i.e., within 1 ms data generation and transmission of generated data are completed), when a time length of a multiplexing transmission channel is 1 ms, time taken by merely demodulating the multiplexing transmission channel to obtain an SR already exceeds the request of the URLLC service. As illustrated in FIG. 1B, a channel indicated via a solid-line box is a channel actually transmitted, and a channel indicated via a dash-line box is not transmitted.

Figure 1C:
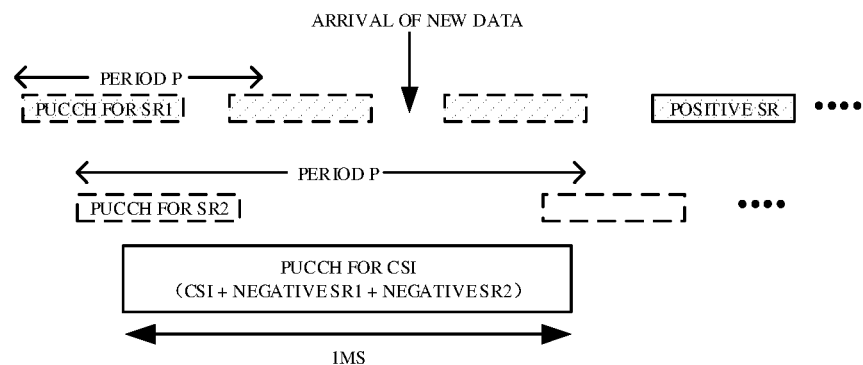
FIG. 1C is a schematic diagram illustrating transmission of an SR configuration and a first uplink channel according to other implementations of the disclosure.

2. Multiplexing transmission only applies to that before transmission of a transmission channel there is to-be-transmitted data in the transmission channel. However, a positive SR is generated during transmission of a transmission channel, and if the positive SR is transmitted after transmission of the transmission channel is completed, the latency of a corresponding URLLC service may be greatly increased. As illustrated in FIG. 1C, a channel indicated via a solid-line box is a channel actually transmitted, and a channel indicated via a dash-line box is not transmitted.

Figure 1D:
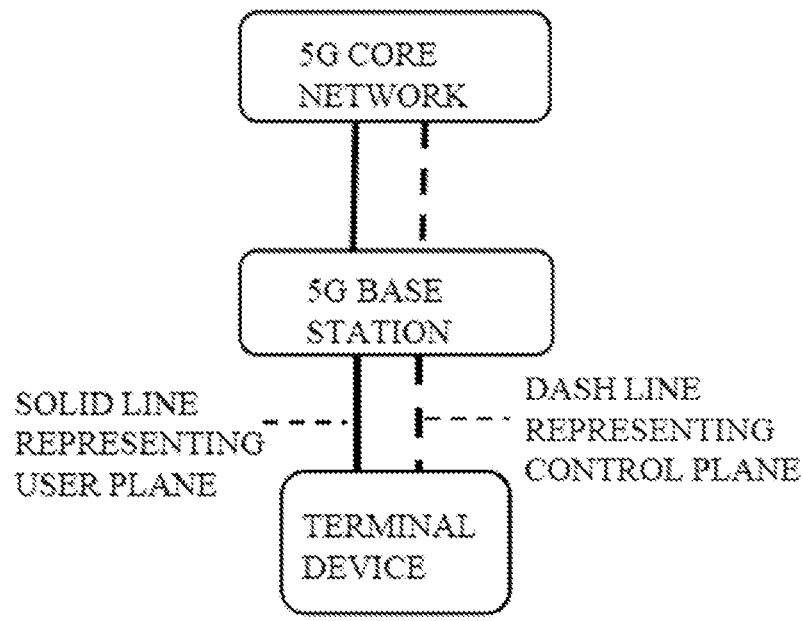
FIG. 1D is a schematic diagram illustrating a fifth generation (5G) standalone (SA) communication system according to implementations of the disclosure.
Figure 1E:
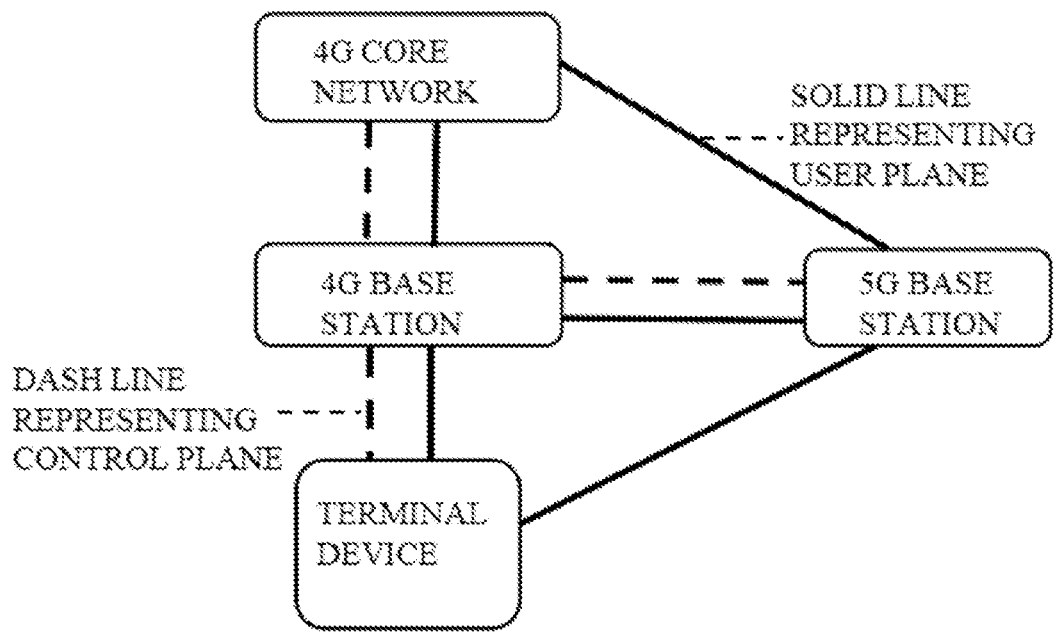
FIG. 1E is a schematic diagram illustrating a 5G non-standalone (NSA) communication system according to implementations of the disclosure.

For the above-mentioned problems, a method for SR transmission is provided according to implementations of the disclosure. The method is applied to a $5^{th}$ generation (5G) NR network architecture. The network architecture may be a non-standalone (NSA) communication network as illustrated in FIG. 1D or a standalone (SA) communication network as illustrated in FIG. 1E, which is not limited in the implementations of the disclosure. In addition, in the implementations of the disclosure, the terminal device may include various terminal devices with a wireless communication function, other processing devices connected to wireless modems, various UE, mobile stations, terminal devices, and so on. Examples of the various terminal devices with the wireless communication function include handheld devices, in-vehicle devices, wearable devices (such as smart watches, smart bands, pedometers, and so on), and computing devices. For the sake of convenience, the devices described above are collectively called the terminal devices. Network devices described in the implementations of the disclosure include a base station, a core network device, and so on.

Figure 2A:
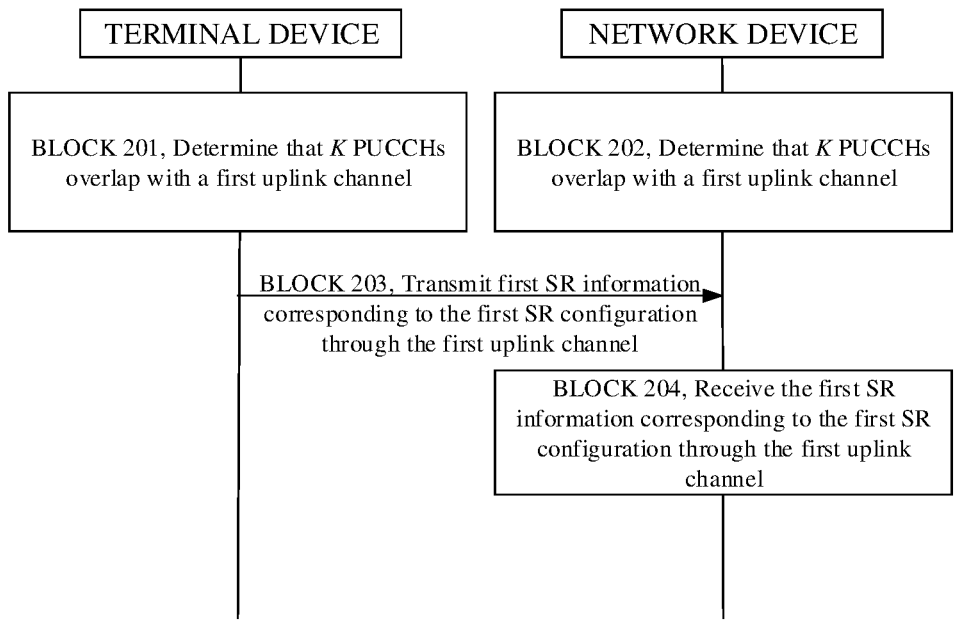
FIG. 2A is a schematic flow chart illustrating a method for SR transmission according to implementations of the disclosure.

FIG. 2A is a schematic flow chart illustrating a method for SR transmission according to implementations of the disclosure. The method is applied to a 5G SA or NSA system and includes the following.

At block 201, a terminal device determines that K PUCCHs overlap with a first uplink channel, where the K PUCCHs are configured to carry SR information corresponding to K SR configurations, and K is a positive integer.

The K PUCCHs overlapping with the first uplink channel means that the K PUCCHs and the first uplink channel at least overlap on time domain, including time-domain resources overlapping and frequency-domain resources not overlapping, or the time-domain resources overlapping and the frequency-domain resources overlapping, where the time-domain resources overlapping includes that the time-domain resources partially or fully overlap, and the frequency-domain resources overlapping includes that the frequency-domain resources partially or fully overlap. The first uplink channel is any one of a PUCCH carrying CSI and/or feedback information, or a physical uplink shared channel (PUSCH), where the feedback information is ACK and NACK.

In an implementation, a network device transmits configuration information to the terminal device, where the configuration information is used for determining the K PUCCHs.

At block 202, the network device determines that the K PUCCHs overlap with the first uplink channel, where the K PUCCHs are configured to carry the SR information corresponding to the K SR configurations, and K is a positive integer.

In an implementation, the terminal device receives the configuration information from the network device, and determines the K PUCCHs according to the configuration information.

At block 203, if the K SR configurations include a first SR configuration that satisfies a first preset condition, the terminal device transmits first SR information corresponding to the first SR configuration through the first uplink channel.

The first preset condition includes at least one of the following. A period corresponding to an SR configuration is greater than or equal to a time-domain length of the first uplink channel. The period corresponding to the SR configuration is greater than or equal to a first threshold. A priority of a PUCCH corresponding to the SR configuration is equal to or lower than a priority of the first uplink channel. A time-domain length of the PUCCH corresponding to the SR configuration is greater than or equal to the time-domain length of the first uplink channel. The time-domain length of the PUCCH corresponding to the SR configuration is greater than or equal to a second threshold. A priority of a logical channel corresponding to the SR configuration is equal to or lower than a priority of a logical channel corresponding to bearer information in the first uplink channel.

As can be seen from the above, multiplexing transmission of low-priority SRs (insensitive for latency) and other information can improve a system transmission efficiency. Since the SR is not sensitive for the latency, system performance can be affected slightly. There is no loss for original information carried in the first uplink channel.

At block 204, the network device receives the first SR information corresponding to the first SR configuration through the first uplink channel, where the first SR configuration is the SR configuration satisfying the first preset condition in the K SR configurations.

As can be seen from the above, in the implementations of the disclosure, it is determined that the K PUCCHs overlap with the first uplink channel, where the K PUCCHs are configured to carry the SR information corresponding to the K SR configurations. If the K SR configurations include the first SR configuration satisfying the first preset condition, the first SR information corresponding to the first SR configuration is transmitted through the first uplink channel. Since the first preset condition can be set according to priority characteristics of SR configurations, it is possible to realize that different transmission methods can be determined according to priority characteristic of different SR configurations, so as to realize that a performance requirement of an SR corresponding to a high-priority service (i.e., URLLC service) can be prioritized and system transmission efficiency can be taken into account for an SR corresponding to a low-priority service (i.e., eMBB service).

In an implementation, if the K SR configurations include a second SR configuration that satisfies a second preset condition, and a second SR corresponding to the second SR configuration is negative, second SR information corresponding to the second SR configuration is not transmitted.

The first preset condition is different from the second preset condition. The second preset condition includes at least one of the following. A period corresponding to an SR configuration is less than or equal to the time-domain length of the first uplink channel. The period corresponding to the SR configuration is less than or equal to a third threshold. A priority of a PUCCH corresponding to the SR configuration is equal to or higher than the priority of the first uplink channel. A time-domain length of the PUCCH corresponding to the SR configuration is less than or equal to the time-domain length of the first uplink channel. The time-domain length of the PUCCH corresponding to the SR configuration is less than or equal to a fourth threshold. A priority of a logical channel corresponding to the SR configuration is equal to or higher than the priority of the logical channel corresponding to the bearer information in the first uplink channel.

As can be seen from the above, high-priority positive SRs (sensitive for latency) can be transmitted first to ensure a latency requirement of a service. The first uplink channel transmitted this time may not be correctly received, i.e., a low-priority channel performance is sacrificed.

In an implementation, if the K SR configurations include a third SR configuration that satisfies the second preset condition, and a third SR corresponding to the third SR configuration is positive, the terminal device transmits third SR information corresponding to the third SR configuration through a PUCCH corresponding to the third SR configuration, where the first preset condition is different from the third preset condition. Correspondingly, the network device receives the third SR information corresponding to the third SR configuration through the PUCCH corresponding to the third SR configuration, where the third SR configuration is an SR configuration satisfying the second preset condition in the K SR configurations, the third SR corresponding to the third SR configuration is positive, and the first preset condition is different from the second preset condition.

In an implementation, in a process of transmitting the third SR information corresponding to the third SR configuration through the PUCCH corresponding to the third SR configuration, the method further includes the following. The first uplink channel is not transmitted on a first time-domain resource, where the first time-domain resource is a time-domain resource occupied by the K PUCCHs. The first uplink channel is not transmitted on a second time-domain resource, where the second time-domain resource is a time-domain resource occupied by the PUCCH corresponding to the third SR configuration. The first uplink channel is not transmitted on a third time-domain resource, where the third time-domain resource includes the second time-domain resource and a part of or all time-domain resources after the second time-domain resource.

Figure 2B:
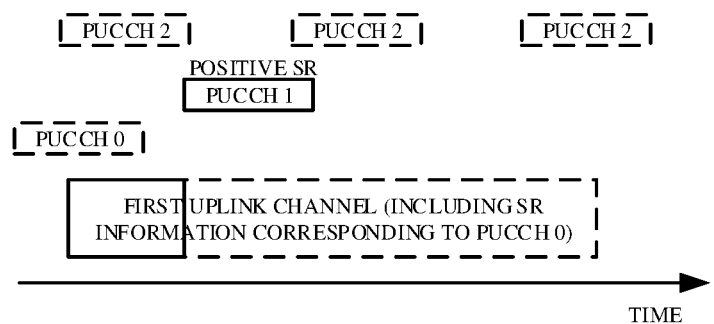
FIG. 2B is a schematic diagram illustrating transmission of an SR configuration and a first uplink channel according to other implementations of the disclosure.

For example, as illustrated in FIG. 2B, suppose PUCCH 0, PUCCH 1, PUCCH 2 respectively correspond to three PUCCH resources determined according to three SR configurations, a priority of PUCCH 0 is level 2 (e.g., corresponding to an eMBB service), a priority of PUCCH 1 is level 1 (e.g., corresponding to a URLLC service), a priority of PUCCH 2 is level 1, the first uplink channel is a PUCCH carrying feedback information corresponding to a physical downlink channel, a priority of the physical downlink channel is level 2 (e.g., corresponding to an eMBB service), an SR corresponding to first PUCCH 1 is a positive SR, and an SR corresponding to PUCCH 2 is a negative SR, it can be determined that SR information multiplexed and transmitted in the first uplink channel indicates that an SR corresponding to PUCCH 0 is positive or negative (corresponding to the above-mentioned low-priority situations), and it can also be determined that first PUCCH 1 is used to transmit a positive SR, and transmission of the first uplink channel is stopped from a time-domain resource for first PUCCH 1.

Figure 2C:
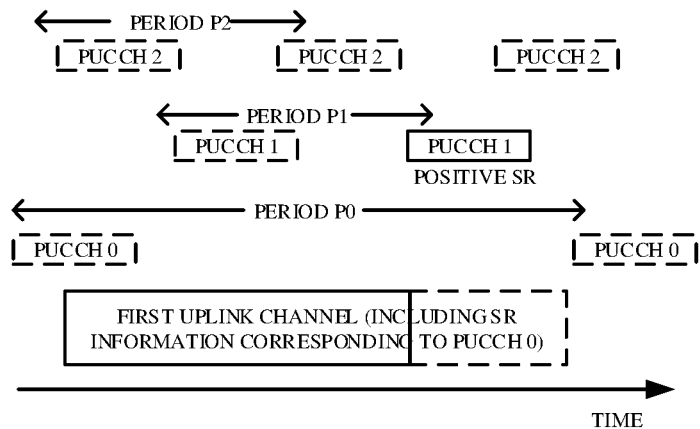
FIG. 2C is a schematic diagram illustrating transmission of an SR configuration and a first uplink channel according to other implementations of the disclosure.

For example, as illustrated in FIG. 2C, suppose PUCCH 0, PUCCH 1, PUCCH 2 respectively correspond to three PUCCH resources determined according to three SR configurations, period P0 of PUCCH 0 is greater than or equal to the time-domain length of the first uplink channel, period P1 of PUCCH 1 is less than the time-domain length of the first uplink channel, period P2 of PUCCH 2 is less than the time-domain length of the first uplink channel, the first uplink channel is a PUCCH carrying CSI, an SR corresponding to second PUCCH 1 is positive, and an SR corresponding to PUCCH 2 is negative, it can be determined that the SR information multiplexed and transmitted in the first uplink channel indicates that an SR corresponding to PUCCH 0 is positive or negative (corresponding to the above-mentioned low-priority situations), and it can also be determined that first PUCCH 1 is used to transmit a positive SR, and the transmission of the first uplink channel is stopped on a time-domain resource occupied by second PUCCH 1.

Figure 2D:
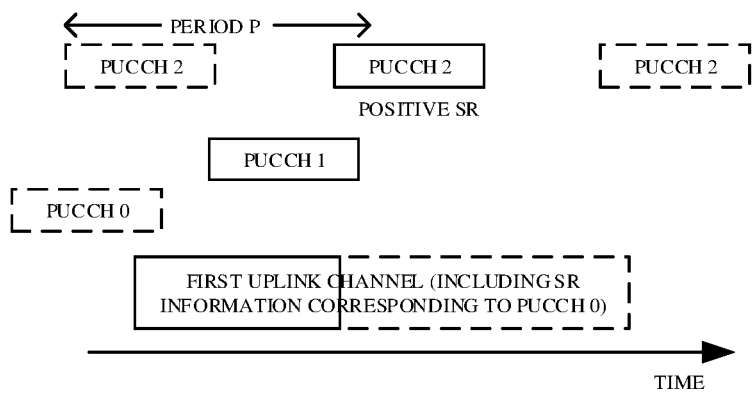
FIG. 2D is a schematic diagram illustrating transmission of an SR configuration and a first uplink channel according to other implementations of the disclosure.

For example, as illustrated in FIG. 2D, suppose PUCCH 0, PUCCH 1, PUCCH 2 respectively correspond to three PUCCH resources determined according to three SR configurations, a priority of PUCCH 0 is level 2 (e.g., corresponding to an eMBB service), a priority of PUCCH 1 is level 1 (e.g., corresponding to a URLLC service), period P of PUCCH 2 is less than the time-domain length of the first uplink channel, the first uplink channel is a PUSCH and has a priority of level 2 (e.g., corresponding to an eMBB service), an SR corresponding to PUCCH 1 is a negative SR, and an SR corresponding to second PUCCH 2 is a positive SR, it can be determined that the SR information multiplexed and transmitted in the first uplink channel indicates that an SR corresponding to PUCCH 0 is positive or negative (corresponding to the above-mentioned low-priority situations), and it can also be determined that second PUCCH 2 is used to transmit a positive SR, and the transmission of the first uplink channel is stopped from a time-domain resource for second PUCCH 2.

In an implementation, the terminal device transmits the first SR information corresponding to the first SR configuration through the first uplink channel as follows. The terminal device transmits the first SR information corresponding to the first SR configuration through the first uplink channel, and transmits original bearer information carried in the first uplink channel through the first uplink channel. Correspondingly, the network device receives the first SR information corresponding to the first SR configuration through the first uplink channel as follows. The network device receives, through the first uplink channel, the first SR information corresponding to the first SR configuration and the original bearer information carried in the first uplink channel.

In an implementation, the first SR configuration includes L SR configurations in the K SR configurations, and L is a positive integer. The terminal device transmits the first SR information corresponding to the first SR configuration through the first uplink channel as follows. The terminal device transmits X-bit information, where the X-bit information indicates that at least one SR corresponding to at least one SR configuration in the L SR configurations is positive or negative, X is determined according to L, and X is a positive integer. Correspondingly, the network device receives the first SR information corresponding to the first SR configuration through the first uplink channel as follows. The network device receives the X-bit information, where the X-bit information indicates that the at least one SR corresponding to the at least one SR configuration in the L SR configurations is positive or negative, X is determined according to L, and X is a positive integer.

The X-bit information indicates information carried via X bits, a value of the X-bit information corresponds to the first SR information, or the value of the X-bit information represents the first SR information.

In an implementation, X is $\lceil \log_2(L+1) \rceil$, and the $\lceil \log_2(L+1) \rceil$-bit information indicates at least one of the following. SRs corresponding to the L SR configurations are all negative (also called no SR). At least one SR corresponding to at least one SR configuration in the L SR configurations is positive.

In an implementation, the $\lceil \log_2(L+1) \rceil$-bit information indicates a resource ID of an SR configuration, where an SR corresponding to the resource ID is positive.

In an implementation, values of the $\lceil \log_2(L+1) \rceil$-bit information are in one-to-one correspondence with the L SR configurations in an ascending order or a descending order of resource IDs of the L SR configurations.

For example, the base station configures K (where K=3) SR configurations, the K SR configurations respectively have schedulingRequestResourceId of 0, schedulingRequestResourceId of 1, schedulingRequestResourceId of 2, and two SR configurations with schedulingRequestResourceId of 0 and schedulingRequestResourceId of 2 satisfy the first preset condition, and thus a corresponding relationship between the values of the $\lceil \log_2(L+1) \rceil$-bit information and the L SR configurations can be determined in a manner illustrated in table 1.

TABLE 1

| $\lceil \log_2(L + 1) \rceil$-bit information, suppose L = 2 | SR |
| --- | --- |
| 00 | No SR (SRs corresponding to L SR configurations are all negative) |
| 01 | An SR corresponding to an SR configuration with a resource ID of 0 is a negative SR |
| 10 | An SR corresponding to an SR configuration with a resource ID of 2 is a positive SR |
| 11 | Reserved |

In the above-mentioned implementations, X is L, the L-bit information is in one-to-one correspondence with the L SR configurations, and a value of each bit information in the L-bit information indicates that an SR corresponding to a corresponding SR configuration is positive or negative.

In an implementation, the L-bit information is in one-to-one correspondence with the L SR configurations in the ascending order or descending order of the resource IDs of the L SR configurations.

Suppose L=5, the L-bit information may be represented as {b0, b1, b2, b3, b4}, resource IDs of five SR configurations may be represented as SRR Id0, SRR Id1, SRR Id2, SRR Id3, and SRR Id4. If the resource IDs of the five SR configurations are arranged as SRR Id2, SRR Id3, SRR Id1, SRR Id0, and SRR Id4 in the ascending order, b0 corresponds to SRR Id2, b1 corresponds to SRR Id3, b2 corresponds to SRR Id1, b3 corresponds to SRR Id0, and b4 corresponds to SRR Id4.

For example, if the base station configures K (where K=3) SR configurations, the three SR configurations respectively have schedulingRequestResourceId of 0, schedulingRequestResourceId of 1, and schedulingRequestResourceId of 2, and two SR configurations with schedulingRequestResourceId of 0 and 2 satisfy the first preset condition, 2-bit information {b0, b1} respectively correspond to resource IDs of 0 and 2.

Figure 3:
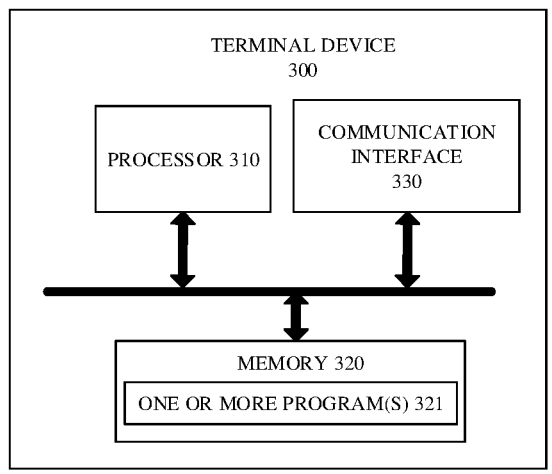
FIG. 3 is a schematic structural diagram illustrating a terminal device according to implementations of the disclosure.

In consistent with the implementations illustrated in FIG. 2A, FIG. 3 is a schematic structural diagram illustrating a terminal device 300 according to implementations of the disclosure. As illustrated in FIG. 3, the terminal device 300 includes a processor 310, a memory 320, a communication interface 330, and one or more programs 321. The one or more programs 321 are stored in the memory 320 and configured to be performed by the processor 310, where the one or more programs 321 includes instructions for performing any operation performed by the terminal device in the above-mentioned method implementations.

Figure 4:
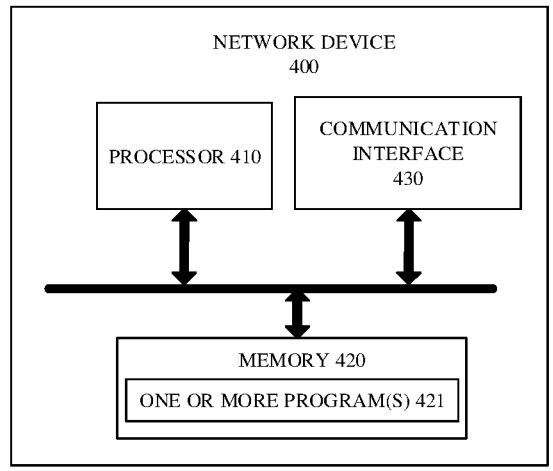
FIG. 4 is a schematic structural diagram illustrating a network device according to implementations of the disclosure.

FIG. 4 is a schematic structural diagram illustrating a network device 400 according to implementations of the disclosure. As illustrated in FIG. 4, the network device 400 includes a processor 410, a memory 420, a communication interface 430, and one or more programs 421. The one or more programs 421 are stored in the memory 420 and configured to be performed by the processor 410, where the one or more programs 421 include instructions for perform any operation performed by the network device in the above-mentioned method implementations.

The foregoing solutions in the implementations of the disclosure is mainly described from the viewpoint of interaction process of various network elements. It can be understood that, in order to implement the above functions, the terminal device includes hardware structures and/or software modules corresponding to the respective functions. Those skilled in the art can readily recognize that, in combination with exemplary units and scheme steps described in the implementations disclosed herein, the present disclosure can be implemented in hardware or a combination of the hardware and computer software. Whether a function is implemented by way of the hardware or computer-software driving hardware depends on particular applications and design constraints of the technical solution. Those skilled in the art may use different methods to implement described functions for each particular application, but such implementation may not be considered as beyond the scope of the present disclosure.

According to the implementations of the disclosure, the terminal device may include various functional units in accordance with the foregoing method implementations. For example, each function corresponds to a functional unit, and two or more functions may be integrated in one processing unit. The above-mentioned integrated unit can be implemented in the form of hardware or software functional modules. It can be noted that the division of units in the implementations of the disclosure is illustrative, and is merely a logical function division, and there may be other division manners in actual implementation.

Figure 5:
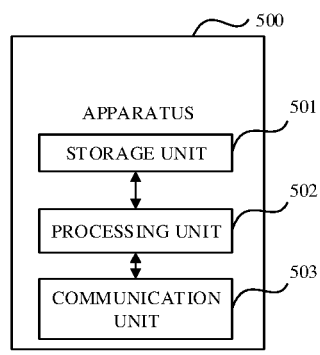
FIG. 5 is a schematic block diagram illustrating function units of an apparatus according to implementations of the disclosure.

In case of the integrated unit, FIG. 5 is a block diagram illustrating functional units of an apparatus 500 for SR transmission according to an implementation of the present disclosure. The apparatus 500 for SR transmission is applied to a terminal device and includes a processing unit 502 and a communication unit 503. The processing unit 502 is configured to control and manage operations of the terminal device. For example, the processing unit 502 is configured to support the terminal device to perform the operations at block 201 and block 203 in FIG. 2A and/or other processes of the technology described in the disclosure. The communication unit 503 is configured to support communication between the terminal device and other devices. The terminal device further includes a storage unit 501 configured to store program codes and data of the terminal device.

The processing unit 502 may be a processor or a controller, for example, a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like. The communication unit 503 may be a communication interface, a transceiver, a transceiver circuit, and the like. The storage unit 501 may be a memory. When the processing unit 502 is the processor, the communication unit 503 is the communication interface, and the storage unit 501 is the memory, the terminal device related in the implementations of the disclosure may be the terminal device illustrated in FIG. 3.

In an implementation, the processing unit 502 is configured to perform any operation performed by the terminal device in the above-mentioned method implementations, and when performing data transmission such as transmitting, it is possible to invoke the communication unit 503 to complete corresponding operations, which will be described below in detail.

The processing unit 502 is configured to determine that K PUCCHs overlap with a first uplink channel, wherein the K PUCCHs are configured to carry SR information corresponding to K SR configurations, and K is a positive integer. If the K SR configurations include a first SR configuration that satisfies a first preset condition, the processing unit 502 is configured to transmit first SR information corresponding to the first SR configuration through the first uplink channel by using the communication unit 503.

In an implementation, if the K SR configurations include a second SR configuration that satisfies a second preset condition, and a second SR corresponding to the second SR configuration is negative, second SR information corresponding to the second SR configuration is not transmitted.

In an implementation, if the K SR configurations include a third SR configuration that satisfies the second preset condition, and a third SR corresponding to the third SR configuration is positive, the processing unit 502 is further configured to transmit third SR information corresponding to the third SR configuration through a PUCCH corresponding to the third SR configuration by using the communication unit 503.

In an implementation, the processing unit 502 is further configured to not transmit the first uplink channel on a first time-domain resource by using the communication unit 503, where the first time-domain resource is a time-domain resource occupied by the K PUCCHs. The processing unit 502 is further configured to not transmit the first uplink channel on a second time-domain resource by using the communication unit 503, where the second time-domain resource is a time-domain resource occupied by the PUCCH corresponding to the third SR configuration. The processing unit 502 is further configured to not transmit the first uplink channel on a third time-domain resource by using the communication unit 503, where the third time-domain resource includes the second time-domain resource and a part of or all time-domain resources after the second time-domain resource.

In an implementation, the first preset condition includes at least one of the following. A period corresponding to an SR configuration is greater than or equal to a time-domain length of the first uplink channel. The period corresponding to the SR configuration is greater than or equal to a first threshold. A priority of a PUCCH corresponding to the SR configuration is equal to or lower than a priority of the first uplink channel. A time-domain length of the PUCCH corresponding to the SR configuration is greater than or equal to the time-domain length of the first uplink channel. The time-domain length of the PUCCH corresponding to the SR configuration is greater than or equal to a second threshold. A priority of a logical channel corresponding to the SR configuration is equal to or lower than a priority of a logical channel corresponding to bearer information in the first uplink channel.

In an implementation, the second preset condition includes at least one of the following. A period corresponding to an SR configuration is less than or equal to the time-domain length of the first uplink channel. The period corresponding to the SR configuration is less than or equal to a third threshold. A priority of a PUCCH corresponding to the SR configuration is equal to or higher than the priority of the first uplink channel. A time-domain length of the PUCCH corresponding to the SR configuration is less than or equal to the time-domain length of the first uplink channel. The time-domain length of the PUCCH corresponding to the SR configuration is less than or equal to a fourth threshold. A priority of a logical channel corresponding to the SR configuration is equal to or higher than the priority of the logical channel corresponding to bearer information in the first uplink channel.

In an implementation, the processing unit 502 configured to transmit the first SR information corresponding to the first SR configuration through the first uplink channel is configured to transmit the first SR information corresponding to the first SR configuration through the first uplink channel by using the communication unit 503, and transmit original bearer information carried in the first uplink channel by using the communication unit 503.

In an implementation, the first SR configuration includes L SR configurations in the K SR configurations, and L is a positive integer. The processing unit 502 configured to transmit the first SR information corresponding to the first SR configuration through the first uplink channel by using the communication unit 503 is configured to transmit X-bit information by using the communication unit 503, where the X-bit information is indicative of that at least one SR corresponding to at least one SR configuration in the L SR configurations is positive or negative, X is determined according to L, and X is a positive integer.

In an implementation, X is $\lceil \log_2(L+1) \rceil$, and the $\lceil \log_2(L+1) \rceil$-bit information indicates at least one of the following. SRs corresponding to the L SR configurations are all negative. At least one SR corresponding to at least one SR configuration in the L SR configurations is positive.

In an implementation, the $\lceil \log_2(L+1) \rceil$-bit information indicates a resource ID of an SR configuration, where an SR corresponding to the resource ID is positive.

In an implementation, values of the $\lceil \log_2(L+1) \rceil$-bit information are in one-to-one correspondence with the L SR configurations in an ascending order or a descending order of resource IDs of the L SR configurations.

In an implementation, X is L, the L-bit information is in one-to-one correspondence with the L SR configurations, and a value of each bit information in the L-bit information indicates that an SR corresponding to a corresponding SR configuration is positive or negative.

In an implementation, the L-bit information is in one-to-one correspondence with the L SR configurations in the ascending order or descending order of the resource IDs of the L SR configurations.

In an implementation, the first uplink channel is any one of a PUCCH carrying CSI and/or feedback information or a PUSCH.

Figure 6:
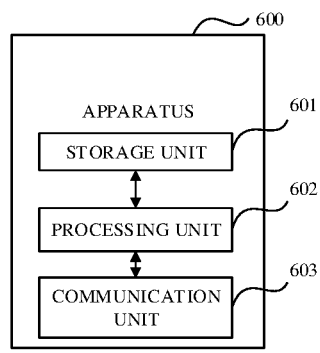
FIG. 6 is a schematic block diagram illustrating function units of an apparatus according to implementations of the disclosure.

In case of the integrated unit, FIG. 6 is a block diagram illustrating functional units of an apparatus for SR transmission according to an implementation of the present disclosure. The apparatus 600 for SR transmission is applied to a network device and includes a processing unit 602 and a communication unit 603. The processing unit 602 is configured to control and manage operations of the network device, for example, the processing unit 602 is configured to support the network device to perform the operations at block 202 and block 204 in FIG. 2A and/or other processes of the technology described in the disclosure. The communication unit 603 is configured to support communication between the network device and other devices. The network device further includes a storage unit 601 configured to store program codes and data of the network device.

The processing unit 602 may be a processor or a controller, for example, a CPU, a general-purpose processor, a DSP, an ASIC, an FPGA, or other programmable logic devices, transistor logic devices, hardware components, or any combination thereof. Various exemplary logical blocks, modules, and circuits described in conjunction with the disclosure may be achieved or implemented. The processor described above may also be a combination of computing functions, for example, a combination of one or more microprocessors, a combination of the DSP and the microprocessor, and the like. The communication unit 603 may be a communication interface, a transceiver, a transceiver circuit, and the like. The storage unit 601 may be a memory. When the processing unit 602 is the processor, the communication unit 603 is the communication interface, and the storage unit 601 is the memory, the network device involved in the implementations of the disclosure may be the network device illustrated in FIG. 4.

In an implementation, the processing unit 602 is configured to perform any operation performed by the network device in the above-mentioned method implementations, and when performing data transmission such as receiving, it is possible to invoke the communication unit 603 to complete corresponding operations, which will be described below in detail.

The processing unit 602 is configured to determine that K PUCCHs overlap with a first uplink channel, where the K PUCCHs are configured to carry SR information corresponding to K SR configurations, and K is a positive integer. The processing unit 602 is configured to receive first SR information corresponding to a first SR configuration through the first uplink channel by using the communication unit 603, where the first SR configuration is an SR configuration satisfying a first preset condition in the K SR configurations.

In an implementation, the processing unit 602 is further configured to receive, through a PUCCH corresponding to a third SR configuration, third SR information corresponding to the third SR configuration by using the communication unit 603, where the third SR configuration is an SR configuration satisfying a second preset condition in the K SR configurations, a third SR corresponding to the third SR configuration is positive, and the first preset condition is different from the second preset condition.

In an implementation, the first preset condition includes at least one of the following. A period corresponding to an SR configuration is greater than or equal to a time-domain length of the first uplink channel. The period corresponding to the SR configuration is greater than or equal to a first threshold. A priority of a PUCCH corresponding to the SR configuration is equal to or lower than a priority of the first uplink channel. A time-domain length of the PUCCH corresponding to the SR configuration is greater than or equal to the time-domain length of the first uplink channel. The time-domain length of the PUCCH corresponding to the SR configuration is greater than or equal to a second threshold. A priority of a logical channel corresponding to the SR configuration is equal to or lower than a priority of a logical channel corresponding to bearer information in the first uplink channel.

In an implementation, the second preset condition includes at least one of the following. A period corresponding to the SR configuration is less than or equal to the time-domain length of the first uplink channel. The period corresponding to the SR configuration is less than or equal to a third threshold. A priority of a PUCCH corresponding to the SR configuration is equal to or higher than the priority of the first uplink channel. A time-domain length of the PUCCH corresponding to the SR configuration is less than or equal to the time-domain length of the first uplink channel. The time-domain length of the PUCCH corresponding to the SR configuration is less than or equal to a fourth threshold. A priority of a logical channel corresponding to the SR configuration is equal to or higher than the priority of the logical channel corresponding to the bearer information in the first uplink channel.

In an implementation, the processing unit 602 configured to receive the first SR information corresponding to the first SR configuration through the first uplink channel by using the communication unit 603 is configured to receive, through the first uplink channel, the first SR information corresponding to the first SR configuration and original bearer information carried in the first uplink channel by using the communication unit 603.

In an implementation, the first SR configuration includes L SR configurations in the K SR configurations, and L is a positive integer. The processing unit 602 configured to receive the first SR information corresponding to the first SR configuration through the first uplink channel by using the communication unit 603 is configured to receive X-bit information by using the communication unit 603, where the X-bit information is indicative of that at least one SR corresponding to at least one SR configuration in the L SR configurations is positive or negative, X is determined according to L, and X is a positive integer.

In an implementation, X is $\lceil \log_2(L+1) \rceil$, and the $\lceil \log_2(L+1) \rceil$-bit information indicates at least one of the following. SRs corresponding to the L SR configurations are all negative. At least one SR corresponding to at least one SR configuration in the L SR configurations is positive.

In an implementation, the $\lceil \log_2(L+1) \rceil$-bit information indicates a resource ID of an SR configuration, where an SR corresponding to the resource ID is positive.

In an implementation, values of the $\lceil \log_2(L+1) \rceil$-bit information are in one-to-one correspondence with the L SR configurations in an ascending order or a descending order of resource IDs of the L SR configurations.

In an implementation, X is L, the L-bit information is in one-to-one correspondence with the L SR configurations, and a value of each bit information in the L-bit information indicates that an SR corresponding to a corresponding SR configuration is positive or negative.

In an implementation, the L-bit information is in one-to-one correspondence with the L SR configurations in an ascending order or a descending order of the resource IDs of the L SR configurations.

In an implementation, the first uplink channel is any one of a PUCCH carrying CSI and/or feedback information or a PUSCH.

A chip is provided according to the implementations of the disclosure. The chip includes a processor configured to invoke and execute computer programs stored in a memory, to cause a device equipped with the chip to perform a part of or all operations performed by the terminal device in the above-mentioned method implementations.

A computer-readable storage medium is provided according to the implementations of the disclosure. The computer-readable storage medium is configured to store computer programs for electronic data interchange, where the computer programs enable a computer to perform a part of or all operations performed by the terminal device in the above-mentioned method implementations.

A computer-readable storage medium is provided according to the implementations of the disclosure. The computer-readable storage medium is configured to store computer programs for electronic data interchange, where the computer programs enable a computer to perform a part of or all operations performed by the network device in the above-mentioned method implementations.

A computer program product is provided according to the implementations of the disclosure. The computer program product includes computer programs. The computer programs are operable with a computer to perform a part of or all operations performed by the terminal device in the above-mentioned method implementations. The computer program product may be a software installation package.

The algorithmic operations and the method described in the implementations of the disclosure may be implemented via hardware, or may be implemented via a manner of executing software instructions by a processor. The software instructions may be composed with corresponding software modules. The software modules can be stored in a storage medium such as a random access memory (RAM), a flash memory, a read only memory (ROM), an erasable programmable read-only memory (EPROM), an electrically erasable programmable read-only memory (EEPROM), a register, a hard disc, a mobile hard disc, or a compact disc read-only memory (CD-ROM), or in any other types of storage media known in this field.

An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in an access network device, a target network device, or a core network device. Of course, the processor and the storage medium may also be presented as discrete components in the access network device, the target network device, or the core network device.

Those skilled in the art can appreciate that, in the above-mentioned one or more implementations, all or part of the described functions can be implemented via software, hardware, firmware, or any other combination thereof. When implemented via software, all or part of the above functions can be implemented in the form of a computer program product. The computer program product includes one or more computer instructions. When the computer instructions are loaded and executed on a computer, all or part of the operations or functions in the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instructions can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server integrated with one or more usable media, a data center, or the like. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned implementations provide further details of the purpose, technical solutions and beneficial effects of the implementations of the disclosure. It can be understood that, the above is only an implementation of the disclosure and is not intended to limit the scope of protection of the disclosure. Any modification, equivalent replacement and improvement made within the spirit and principles of the disclosure shall be included in the scope of protection of the disclosure.

What is claimed is:

1. A method for scheduling request (SR) transmission, the method being applied to a terminal device and comprising:
in response to K SR configurations comprising a first SR configuration that satisfies a first preset condition, transmitting first SR information corresponding to the first SR configuration through a first uplink channel, wherein the first uplink channel is a physical uplink control channel (PUCCH) carrying channel state information (CSI), time-domain resources of K PUCCHs overlap with time-domain resources of the first uplink channel, the K PUCCHs are configured to carry SR information corresponding to the K SR configurations, K is a positive integer, and the first preset condition comprises a priority of the PUCCH corresponding to the first SR configuration being equal to a priority of the first uplink channel; and
in response to the K SR configurations comprising a third SR configuration that satisfies a second preset condition, and a third SR corresponding to the third SR configuration being positive, transmitting third SR information corresponding to the third SR configuration through a PUCCH corresponding to the third SR configuration in the K PUCCHs, and not transmitting the first uplink channel on a second time-domain resource, wherein the second time-domain resource is a time-domain resource occupied by the PUCCH corresponding to the third SR configuration, and the second preset condition comprises a priority of the PUCCH corresponding to the third SR configuration being higher than the priority of the first uplink channel.

2. The method of claim 1, wherein the first SR configuration comprises L SR configurations in the K SR configurations, and L is a positive integer;
wherein transmitting the first SR information corresponding to the first SR configuration through the first uplink channel comprises:
transmitting X-bit information, wherein the X-bit information represents that SR information corresponding to at least one SR configuration in the L SR configurations is positive or negative, X is determined according to L, and X is a positive integer.

3. The method of claim 2, wherein X is $\lceil \log_2(L+1) \rceil$, and the $\lceil \log_2(L+1) \rceil$-bit information represents at least one of:
SR information corresponding to the L SR configurations being all negative; or
SR information corresponding to at least one SR configuration in the L SR configurations being positive.

4. The method of claim 3, wherein:
the SR information corresponding to the at least one SR configuration in the L SR configurations is positive; and
the $\lceil \log_2(L+1) \rceil$-bit information is used to indicate a resource identity (ID) of an SR configuration, wherein SR information corresponding to the resource ID is positive.

5. The method of claim 4, wherein the SR information corresponding to the at least one SR configuration in the L SR configurations is positive, and values of the $\lceil \log_2(L+1) \rceil$-bit information correspond to the L SR configurations in an ascending order or a descending order of resource IDs of the L SR configurations.

6. A method for scheduling request (SR) transmission, the method being applied to a network device and comprising:
receiving first SR information corresponding to a first SR configuration through a first uplink channel, wherein the first SR configuration is an SR configuration satisfying a first preset condition in the K SR configurations, and wherein the first uplink channel is a physical uplink control channel (PUCCH) carrying channel state information (CSI), time-domain resources of K PUCCHs overlap with time-domain resources of the first uplink channel, the K PUCCHs are configured to carry SR information corresponding to the K SR configurations, K is a positive integer, and the first preset condition comprises a priority of the PUCCH corresponding to the first SR configuration being equal to a priority of the first uplink channel; and
receiving third SR information corresponding to a third SR configuration through a PUCCH corresponding to the third SR configuration in the K PUCCHs, wherein the third SR configuration is an SR configuration satisfying a second preset condition in the K SR configurations, the second preset condition comprises a priority of the PUCCH corresponding to the third SR configuration being higher than the priority of the first uplink channel, a third SR corresponding to the third SR configuration is positive, and no transmission of the first uplink channel is received on a second time-domain resource occupied by the PUCCH corresponding to the third SR configuration.

7. The method of claim 6, wherein the first SR configuration comprises L SR configurations in the K SR configurations, and L is a positive integer;
wherein receiving the first SR information corresponding to the first SR configuration through the first uplink channel comprises:
receiving X-bit information, wherein the X-bit information represents that SR information corresponding to at least one SR configuration in the L SR configurations is positive or negative, X is determined according to L, and X is a positive integer.

8. A terminal device comprising:
a transceiver;
a processor; and
a memory storing a computer program which, when executed by the processor, causes the transceiver to:
transmit, in response to K SR configurations comprising a first SR configuration that satisfies a first preset condition, first SR information corresponding to the first SR configuration through a first uplink channel, wherein the first uplink channel is a physical uplink control channel (PUCCH) carrying channel state information (CSI), time-domain resources of K PUCCHs overlap with time-domain resources of the first uplink channel, the K PUCCHs are configured to carry SR information corresponding to the K SR configurations, K is a positive integer, and the first preset condition comprises a priority of the PUCCH corresponding to the first SR configuration being equal to a priority of the first uplink channel; and transmit, in response to the K SR configurations comprising a third SR configuration that satisfies a second preset condition and a third SR corresponding to the third SR configuration being positive, third SR information corresponding to the third SR configuration through a PUCCH corresponding to the third SR configuration in the K PUCCHs, and not transmit the first uplink channel on a second time-domain resource, wherein the second time-domain resource is a time-domain resource occupied by the PUCCH corresponding to the third SR configuration, and the second preset condition comprises a priority of the PUCCH corresponding to the third SR configuration being higher than the priority of the first uplink channel.

9. The terminal device of claim 8, wherein the first SR configuration comprises L SR configurations in the K SR configurations, and L is a positive integer;

wherein the computer program causing the transceiver to transmit the first SR information corresponding to the first SR configuration through the first uplink channel causes the transceiver to:

transmit X-bit information, wherein the X-bit information represents that SR information corresponding to at least one SR configuration in the L SR configurations is positive or negative, X is determined according to L, and X is a positive integer.

10. The terminal device of claim 9, wherein X is $\lceil \log_2(L+1) \rceil$, and the $\lceil \log_2(L+1) \rceil$-bit information represents at least one of:

SR information corresponding to the L SR configurations being all negative; or

SR information corresponding to at least one SR configuration in the L SR configurations being positive.

11. The terminal device of claim 10, wherein:

the SR information corresponding to the at least one SR configuration in the L SR configurations is positive; and the $\lceil \log_2(L+1) \rceil$-bit information is used to indicate a resource identity (ID) of an SR configuration, wherein SR information corresponding to the resource ID is positive.

12. The terminal device of claim 11, wherein the SR information corresponding to the at least one SR configuration in the L SR configurations is positive, and values of the $\lceil \log_2(L+1) \rceil$-bit information correspond to the L SR configurations in an ascending order or a descending order of resource IDs of the L SR configurations.

* * * * *